United States Patent
Decker et al.

(10) Patent No.: US 10,185,782 B2
(45) Date of Patent: Jan. 22, 2019

(54) MODE IDENTIFICATION FOR SELECTIVE DOCUMENT CONTENT PRESENTATION

(71) Applicant: Apple Inc., Cupertino, CA (US)

(72) Inventors: Kevin Decker, San Jose, CA (US); Giovanni Donelli, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 288 days.

(21) Appl. No.: 14/317,330

(22) Filed: Jun. 27, 2014

(65) Prior Publication Data
US 2014/0359412 A1    Dec. 4, 2014

Related U.S. Application Data

(63) Continuation of application No. 12/621,462, filed on Nov. 18, 2009, now Pat. No. 8,806,325.

(51) Int. Cl.
*G06F 17/30*    (2006.01)

(52) U.S. Cl.
CPC .. *G06F 17/30905* (2013.01); *G06F 17/30882* (2013.01); *G06F 17/30902* (2013.01); *G06F 17/30899* (2013.01)

(58) Field of Classification Search
CPC ...... G06F 17/22; G06F 17/2235; G06F 17/24; G06F 17/241; G06F 17/30; G06F 17/30719
USPC ................. 715/205, 209, 230, 254
See application file for complete search history.

(56) References Cited

U.S. PATENT DOCUMENTS

| | | | |
|---|---|---|---|
| 5,369,508 A | 11/1994 | Lech et al. | |
| 5,774,666 A | 6/1998 | Portuesi | |
| 5,838,326 A * | 11/1998 | Card | G06F 3/04815 715/775 |
| 5,895,470 A * | 4/1999 | Pirolli | G06F 17/3069 707/727 |
| 6,038,574 A * | 3/2000 | Pitkow | G06F 17/3061 707/999.102 |
| 6,223,145 B1 * | 4/2001 | Hearst | G06F 17/30643 703/22 |
| 6,256,648 B1 * | 7/2001 | Hill | G06F 17/30994 707/E17.111 |
| 6,297,824 B1 * | 10/2001 | Hearst | G06F 17/30696 345/901 |

(Continued)

FOREIGN PATENT DOCUMENTS

WO    WO 2007/004086 A1    1/2007

OTHER PUBLICATIONS

Card et al.; "The WebBook and the Web Forager: An Information Workspace for the World-Wide Web;" Computer-Human Interaction 96; Apr. 1996; ACM, Inc., pp. 111-117.*

(Continued)

*Primary Examiner* — Andrew R Dyer
(74) *Attorney, Agent, or Firm* — Ronald Fernando; Fernando & Partners, LLP (57) ABSTRACT

Methods and apparatuses that identify one of a plurality of modes from a web page associated with a document received at a browser are described. An identified mode may correspond to a user interface configuration. A portion of content may be extracted from the document for a presentation configured by the user interface configuration. A presentation of the extracted content may be displayed on a display screen while excluding a reset of the document without displaying the web page.

16 Claims, 9 Drawing Sheets

(56) References Cited

U.S. PATENT DOCUMENTS

| | | | |
|---|---|---|---|
| 6,300,947 B1 | 10/2001 | Kanevsky | |
| 6,452,609 B1 | 9/2002 | Katinsky et al. | |
| 6,457,028 B1* | 9/2002 | Pitkow | G06F 17/3061 |
| | | | 707/999.005 |
| 6,604,103 B1 | 8/2003 | Wolfe | |
| 6,788,316 B1 | 9/2004 | Ma et al. | |
| 6,807,570 B1 | 10/2004 | Allen et al. | |
| 7,015,910 B2* | 3/2006 | Card | G06F 3/04815 |
| | | | 345/419 |
| 7,047,033 B2* | 5/2006 | Wyler | G06F 17/30905 |
| | | | 455/552.1 |
| 7,069,518 B2* | 6/2006 | Card | G06F 3/04815 |
| | | | 715/757 |
| 7,159,011 B1 | 1/2007 | Knight et al. | |
| 7,249,319 B1* | 7/2007 | Payne | G06F 17/212 |
| | | | 345/619 |
| 7,415,538 B2* | 8/2008 | Maes | G06F 17/30905 |
| | | | 707/E17.121 |
| 7,647,550 B1 | 1/2010 | Nguyen | |
| 7,657,652 B1 | 2/2010 | Balaji | |
| RE41,754 E | 9/2010 | Knight | |
| 7,792,925 B1 | 9/2010 | Werner et al. | |
| 8,156,419 B2 | 4/2012 | Choudhary et al. | |
| 8,156,428 B1* | 4/2012 | Rowe | G06F 17/2229 |
| | | | 715/255 |
| 8,533,580 B1* | 9/2013 | Xu | G06F 3/04815 |
| | | | 715/205 |
| 2002/0077900 A1 | 6/2002 | Thompson et al. | |
| 2002/0080170 A1 | 6/2002 | Goldberg et al. | |
| 2002/0093505 A1 | 7/2002 | Hill et al. | |
| 2002/0116421 A1* | 8/2002 | Fox | G06F 17/21 |
| | | | 715/201 |
| 2002/0120653 A1 | 8/2002 | Kraft et al. | |
| 2003/0184582 A1 | 10/2003 | Cohen | |
| 2004/0049737 A1 | 3/2004 | Hunt et al. | |
| 2004/0060008 A1 | 3/2004 | Marshall | |
| 2004/0080532 A1* | 4/2004 | Cragun | G06F 17/30716 |
| | | | 715/745 |
| 2004/0108992 A1 | 6/2004 | Rosenberry | |
| 2004/0128618 A1 | 7/2004 | Datta | |
| 2004/0148571 A1 | 7/2004 | Lue | |
| 2005/0097458 A1 | 5/2005 | Wilson | |
| 2006/0036955 A1 | 2/2006 | Baudisch et al. | |
| 2006/0136571 A1 | 6/2006 | Kloba et al. | |
| 2006/0156229 A1* | 7/2006 | Morgan | G06F 17/30861 |
| | | | 715/205 |
| 2006/0218146 A1* | 9/2006 | Bitan | G06F 17/30864 |
| 2006/0288275 A1* | 12/2006 | Chidlovskii | G06F 17/30923 |
| | | | 715/236 |
| 2007/0050708 A1* | 3/2007 | Gupta | G06F 17/30908 |
| | | | 715/235 |
| 2007/0073777 A1 | 3/2007 | Werwath et al. | |
| 2007/0150484 A1 | 6/2007 | Funge et al. | |
| 2007/0260702 A1 | 11/2007 | Richardson et al. | |
| 2008/0046536 A1* | 2/2008 | Broda | H04L 67/2842 |
| | | | 709/217 |
| 2008/0055613 A1* | 3/2008 | Hatfield | G06F 17/30899 |
| | | | 358/1.2 |
| 2008/0065649 A1* | 3/2008 | Smiler | G06F 17/30893 |
| 2008/0077936 A1 | 3/2008 | Goel et al. | |
| 2008/0195936 A1* | 8/2008 | White | G06F 9/4443 |
| | | | 715/246 |
| 2008/0275890 A1 | 11/2008 | Chakrabarti et al. | |
| 2008/0275901 A1 | 11/2008 | Chakrabarti et al. | |
| 2008/0281827 A1 | 11/2008 | Wang et al. | |
| 2008/0301540 A1 | 12/2008 | Sava et al. | |
| 2009/0021790 A1* | 1/2009 | Krovitz | G06F 3/0482 |
| | | | 358/1.18 |
| 2009/0051692 A1 | 2/2009 | Gralley | |
| 2009/0112839 A1 | 4/2009 | Fisher et al. | |
| 2009/0248707 A1 | 10/2009 | Mehta et al. | |
| 2009/0326973 A1 | 12/2009 | Hurewitz | |
| 2010/0115388 A1 | 5/2010 | Nguyen | |
| 2010/0281351 A1* | 11/2010 | Mohammed | G06F 3/1204 |
| | | | 715/205 |
| 2010/0305969 A1 | 12/2010 | Bacon | |
| 2010/0306249 A1 | 12/2010 | Hill et al. | |
| 2010/0313108 A1 | 12/2010 | Lueck | |
| 2011/0099294 A1 | 4/2011 | Kapur et al. | |
| 2012/0011428 A1 | 1/2012 | Chisholm | |
| 2014/0245257 A1* | 8/2014 | Kusmer | G06F 8/34 |
| | | | 717/113 |

OTHER PUBLICATIONS

Matthew Webber; Automatic Web Page Concatenation; May 2005; Advanced Undergraduate Project thesis, Massachusetts Institute of Technology; pp. 1-18.*

Donald A. Norman; The Invisible Computer; 1999; MIT Press; pp. 123-126.*

Arjun Janah; Instructions for Full-Screen Viewing; 2000; suniljanah.org; pp. 1-3.*

Skweezer, 2001-2009, http://www.skweezer.com/prf.aspx, 1 pg.

"Readability", Arc90 Lab, http://lab.arc90.com/2009/03/02/readability, Mar. 2, 2009, 3 pgs.

See JavaFX™: Developing Rich Internet Applications by: Jim Clarke; Jim Conners: Eric Bruno Publisher; Prentice Hall Pub. Jun. 1, 2009, pp. 256-258.

Luo, et al., Web Article Extraction for Web Printing: A DOM+Visual based Approach, DocEng '09, Sep. 16-18, 2009, Munich, Germany, pp. 2-5.

Kowalkiewicz, et al., Towards more personalized Web: Extraction and integration of dynamic content from the Web, Lecture Notes in Computer Science, Jan. 2006, pp. 2-9.

Joshi, et al., Web Document Text and Image Extraction using DOM Analysis and Natural Language Processing, DocEng '09, Sep. 16-18, 2009, Munich, Germany, pp. 2-5.

Gupta, et al., DOM-based Content Extraction of HTML Documents, WWW '03 Proceedings of the 12th International conference on World Wide Web, May 20-24, 2003, Budapest, Hungary, pp. 1-9.

Prasad, et al., CoreEx: Content Extraction from Online News Articles, CIKM '08 Proceedings of the 17th ACM conference on Information and knowledge management, Oct. 26-30, 2008, Napa Valley, CA, pp. 1-5.

MCODE Documentation, Bader Lab, Univ. of Toronto, available at http://baderlab.org/Software/MCODE/UsersManual, last updated Jul. 28, 2009, pp. 1-7.

* cited by examiner

Analyzing a web page corresponding to a document in a reader mode to select an article from the document, the article including one or more elements, the web page represented by a document object tree including topological relationships among the elements 301

Extracting the article from the document, the article represented by an article tree including clones of the elements, the article tree maintaining the topological relationships among the clones of the elements 303

Determining if the article is continued in additional documents (e.g. based on a set of heuristic rules on the document object tree) 305

Preloading the additional documents to update the article tree with additional content extracted from the additional documents, if the article is continued 307

Rendering the article tree (e.g. generating an article rendering tree) for one or more pages configured (e.g. according to parameters including number of pages, page size, page layout aspect ratio, etc.) independent of the article for a display area of a display device 309

Displaying the article in the one or more pages without displaying the web page from the browser 311

Identifying an application from a web page represented by a rendered document object tree corresponding to a document in a browser, the rendered document object tree including a target presentation area and one or more links to binary sources associated with the application 701

Extracting configuration parameters for the application from the document object tree 703

Retrieving the binary sources via the links 705

Invoking the application configured by the configuration parameters with the binary sources in full screen mode without displaying the web page via the browser 707

MODE IDENTIFICATION FOR SELECTIVE DOCUMENT CONTENT PRESENTATION

This application is a continuation of co-pending U.S. application Ser. No. 12/621,462 filed on Nov. 18, 2009.

FIELD OF THE INVENTION

The present invention relates generally to user interface. More particularly, this invention in one embodiment relates to identifying a mode for a document to selectively present the document content in a browser.

BACKGROUND

With the fast advance of browser technologies and World Wide Web infrastructures, more and more content or applications are accessed via a browser. For example, a long article may be hyperlinked in multiple web documents designed for a reader to browse; a multimedia player may be embedded inside a web document for a browser to activate playing multimedia content remotely linked; or a game application may be downloaded and invoked when a web document is opened by a browser, etc.

However, most web documents are designed to carry a variety of content elements for multiple purposes. Often times, a user interested in a portion of content or an interactive application can be presented with myriads of information of no interest to the user at all. It is not unusual for a browser user to be distracted by navigation controls, user interface controls of a web document, advertising, marketing, or promotional campaign from a web document while trying to focus only on the interested portion of content.

Therefore, accessing content or invoking interactive applications included in web documents via traditional browsers do not provide users with smooth, focused and friendly experiences.

SUMMARY OF THE DESCRIPTION

An embodiment of the present invention can include methods and apparatuses that identify one of a plurality of modes from a web page associated with a document received at a browser. A redacted version of the document may be produced according to an identified mode. A portion of content may be extracted from the document for a presentation of the redacted version, and the extraction can be automatically performed by a data processing system without assistance from a user. Optionally, the extraction can be performed in response to a user's command to create or present the redacted version. A presentation of the extracted content may be displayed on a display screen while excluding a rest of the document which can correspond to, for example, a web page.

In an alternative embodiment, a web page corresponding to a hypertext document may be analyzed to identify a reader mode for an article including one or more elements in the document. The analysis may produce a reader mode or other modes for the hypertext document. A document object tree maintaining topological relationships among the elements may represent the web page inside a browser. The article may be extracted from the web page into an article tree including clones of the elements having the topological relationships. The article tree may be rendered for one or more windows configured independent of the article on a display area of a display device. The article may be displayed on the one or more windows according to the rendered article tree without displaying the web page.

In another embodiment, a special mode can be identified for a document received at a browser which is capable of presenting the document in a regular mode according to a hypertext rendering standard. A special mode may be one or more modes including, for example, a reader mode for presenting an article obtained from a web page, a movie mode for playing multimedia content (e.g. a movie clip) obtained from a web page, and a gallery mode for presenting a slide show obtained from a web page, etc. Accordingly, selected content may be extracted from the document to configure a presentation for the identified mode without presenting the rest of the document.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and apparatuses for determining permanent memory growth are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a reader mode or a view mode can be identified or produced for a document received at a browser to allow a user to access an article included in the document in a manner similar to reading a book. Heuristic rules or decisions may be employed to determine if a document can be redacted to produce a reader mode based on topology and or geometric attributes (e.g. layout parameters) of a rendered DOM (document object model) tree representing the document in the browser. Additional documents hyperlinked may be preloaded to extract a complete article for presentation. User interface for a reader mode may be configured according to book page layouts making use of most screen display real estate in a visually appealing manner independent of particular articles or documents.

A special mode for a document, such as a movie mode, a gallery mode, a game mode or other modes, may invoke an application other than a browser. The application may be a plug-in application embedded or linked within the document, which might be invoked via a browser presenting a web page corresponding to the document in a regular mode. In one embodiment, a document identified with a special mode associated with an application may cause an invocation of the application directly in full screen mode without presenting surrounding content not related to the application in the document. As a result, distractions from the surrounding content of the document can be minimized or eliminated. For example, presenting a document identified in a movie mode may correspond to a short cut to bring up in full screen an embedded plug-in movie application without a need for a user to click, for example, screen control buttons in a corresponding web page when presented by a browser for the document in a regular mode. In some embodiments, a full screen can be synthetic to occupy the whole browser window instead of the whole display window.

Figure 1:
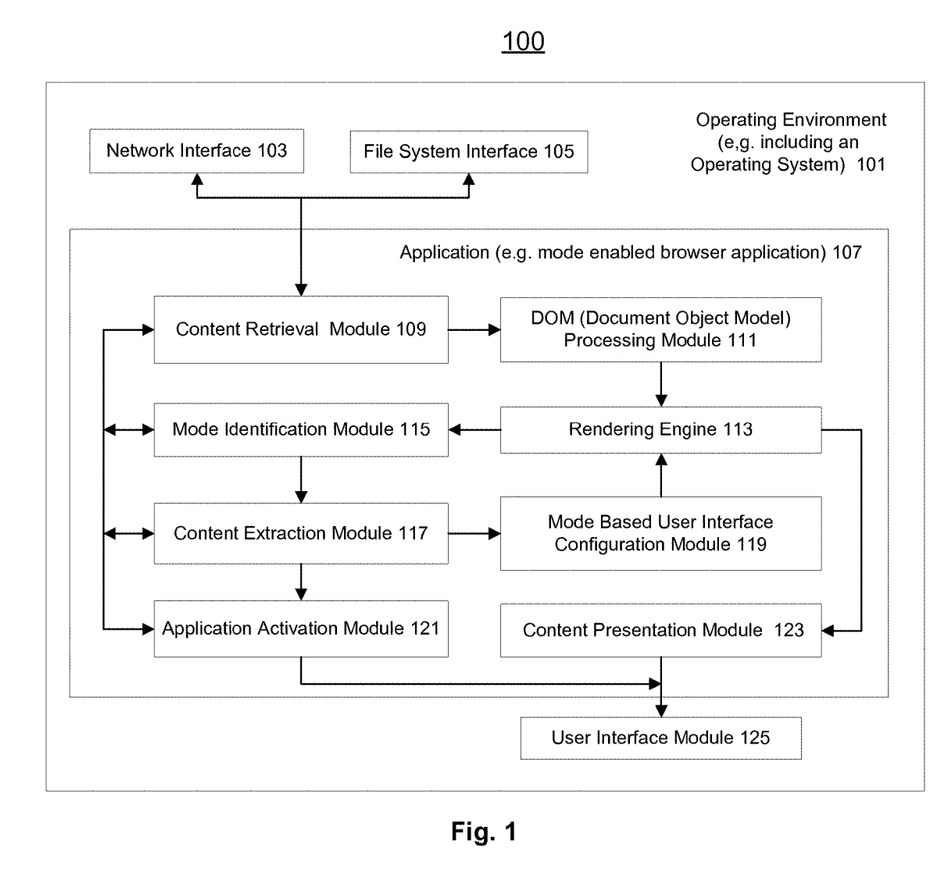
FIG. 1 is a block diagram illustrating one embodiment of a system to identify a mode to selectively present content from a document.

FIG. 1 is a block diagram illustrating one embodiment of a system 100, such as in a data processing system or a computer, to identify a mode to selectively present content from a document. System 101 can be a computer operating environment including an operating system and/or an application 107, such as a mode enabled browser, to present a document received by identifying a mode from the document. Content retrieval module 109 may retrieve a document or content from a network via a network interface 103 (e.g. from a remote web server) or a file system locally or remotely coupled via file system interface 105. In one embodiment, a document received can be hypertext based, such as HTML (Hyper Text Markup Language), DHTML (Dynamic HTML), XML (Extensible Markup Language), or other markup languages etc.

In one embodiment, DOM processing module 111 can process (e.g. parse) a document to identify document elements and generate a DOM tree out of the document elements. A document element may be a hypertext element such as an HTML tag in an HTML document. In one embodiment, a DOM tree may represent a topological or structural relationship among the document elements. Each node in a DOM tree of a document may correspond to one document element of the document. Document elements may include document content and/or layout specifications, such as size attributes associated with HTML tags in an HTML document, for presenting the document content. In one embodiment, rendering engine 113 may generate rendering information, such as layout parameters (e.g. sizing data of a rectangular area) for each node in a DOM tree for presenting a corresponding document. Rendering engine 113 can make rendering decisions according to configurations including layout specifications in a document, user interface settings for application 107 and/or other system settings, etc. A web page may be represented by a rendered DOM tree via rendering engine 113.

In one embodiment, mode identification module 115 can determine if a document received is associated with a special mode for presentation. Typically, application 107 can present a document received in a regular mode according to an original rendered DOM tree directly from DOM processing module 111 and rendering engine 113. A document in a regular mode may be presented as a standard web page by a standard browser. Alternatively, if a special mode is identified for the document, application 107 may not present the document in the regular mode. A special mode may include document independent user interface configurations, such as designating a plurality of target areas on a display screen for presentation. In one embodiment, mode identification module 115 may apply a set of heuristic rules to determine if a document is associated with a special mode. Mode identification module 115 may retrieve meta data via links obtained from a DOM tree or a document to determine a special mode for the document. In some embodiments, mode identification module 115 may receive user instructions from a user to assign a special mode for a document.

If a document is identified with a special mode, in one embodiment, content extraction module 117 can select, e.g. heuristically, targeted content to present from the document according to the special mode. Content extraction module 117 may clone sub trees selected from an original DOM tree for a mode specific DOM tree representing the selected document, such as an article, under the special mode. In one embodiment, content extraction module 117 can preload additional portions of the selected document, e.g. a long article having multiple parts hyperlinked, via content retrieval module 109 to update the mode specific DOM tree. In one embodiment, mode based user interface configuration module 119 can provide configurations for rendering engine 113 to render the mode specific DOM tree. For example, user interface configurations for a reader mode may include two windows arranged like a book view on a display screen for rendering engine 113 to render an article represented by a reader mode specific DOM tree. Content presentation module 123 can present a rendered DOM tree, e.g. based on a document associated with a regular mode or selected content from a document in a special mode.

In one embodiment, mode identification module 115 may identify a special mode to activate an application for a document. For example, mode identification module 115 may identify a multimedia application, such as a slide show player, a movie player, or other players, to play content sources (e.g. binary data) linked via a document received. Mode identification module 115 can heuristically determine an application for a special mode based on a rendered DOM tree for a document, e.g. according to layout parameters indicating a large area allocated for content sources linked in the rendered DOM tree. In one embodiment, an application for a special mode identified may already been installed in system 101. Alternatively, content extraction module 117 may download and/or install the application dynamically by following links in the received document via content retrieval module 109.

Application activation module 121 can invoke an application for a special mode identified for a document. In one embodiment, content extraction module 117 may provide application activation module 121 configuration parameters and/or content sources extracted from a rendered DOM tree for the document. For example, content extraction module 121 can preload media sources for a movie player linked in a document identified in a movie mode. Application activation module 121 may be configured to invoke an application in a full screen or near full screen mode. In one embodiment, application presentation module 121 or content presentation module 123 may instruct user interface module 125 to darken background areas in a display screen for a presentation.

Figure 2:
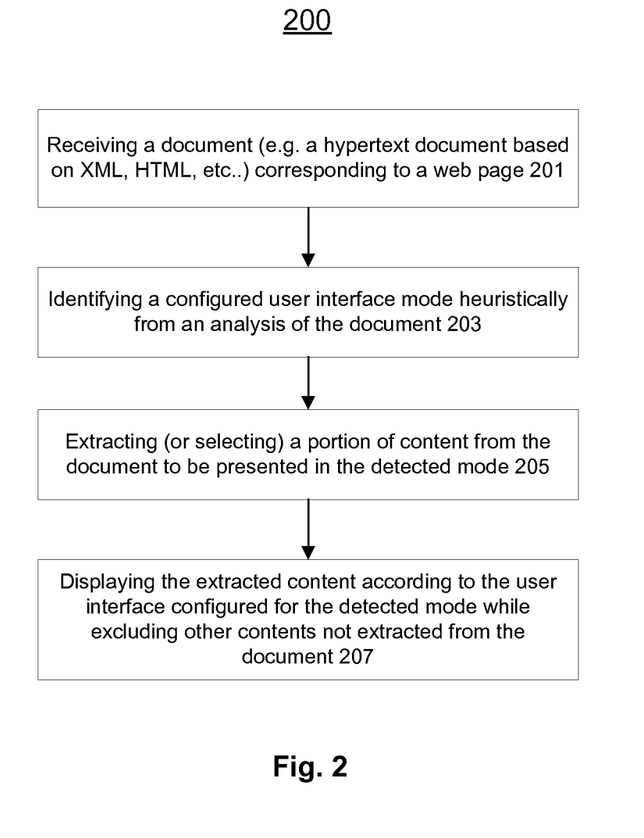
FIG. 2 is a flow diagram illustrating one embodiment of a process to identify a mode to selectively present content from a document.

FIG. 2 is a flow diagram illustrating one embodiment of a process to identify a mode associated with a configured user interface to selectively present content from a document. Exemplary process 200 may be performed by a processing logic that may comprise hardware (circuitry, dedicated logic, etc.), software (such as is run on a dedicated machine), or a combination of both. For example, process 200 may be performed by some components of system 100 of FIG. 1. In one embodiment, at block 201, the processing logic of process 200 can receive a document, such as a hypertext document from a remote server in response to a browsing request from a user. The processing logic of process 200 may open a local file or a cached file corresponding to the document. A hypertext document may include raw content data and/or layout specifications for presenting the content included in a standard browser, such as Internet Explorer® from Microsoft Corporation or Safari® from Apple Inc.

At block 203, the processing logic of process 200 may identify a special mode associated with a document received, such as a reader mode, a movie mode, a gallery mode, a game mode etc. Each mode may correspond to a user interface configuration to present content extracted from the document. A browser may present a document as a standard web page independent of whether the document is associated with a specific mode.

In some embodiments, the processing logic process 200 may analyze a document to determine one of a set of modes for at least one portion of the document in response to instructions, for example, to present a redacted version of the document. Typically, a document may include one or more of a plurality of types of content. A type of content may be based on text articles, multimedia movie, or picture gallery etc. Each of the modes identified or determined may correspond to presenting a separate one of the types of content.

In one embodiment, the processing logic of process 200 may analyze a received document to identify a special mode according to a set of heuristic rules. For example, the processing logic of process 200 may inspect a rendered DOM tree representing a web page corresponding to the document to identify one or more special modes for the document. If no special mode can be identified from a document, the document may be in a regular mode. The processing logic of process 200 may determine a special mode for a document according to meta data (e.g. special tags with attribute value to indicate a special mode) included or linked in the document. In some embodiments, the processing logic of process 200 may solicit user inputs to specify a particular mode or select among several possible modes identified.

At block 205, the processing logic of process 200 may select or extract content from a document according to a identified mode. For example, the processing logic of process 200 may extract a portion of content related to an article if a reader mode is identified. In one embodiment, the processing logic of process 200 may preload documents linked via a document in a special mode to extract additional content for presentation in the special mode, such as multiple parts of an article for presentation in a reader more or multiple slide images for a slide show application in a gallery mode.

At block 207, according to one embodiment, the processing logic of process 200 can display selected content from a document according to a identified mode without presenting a web page corresponding to the document. Alternatively, portions of content not selected from the document are redacted. The presentation may be based on a user interface configured according to the identified mode, such as a full screen presentation or a book page like presentation. Non-selected content in the document, such as advertisement content or other promotional information, may be excluded in the presentation for the identified mode. Typically, user interface configurations for a special mode may be independent of layout specifications in a document.

Figure 3:
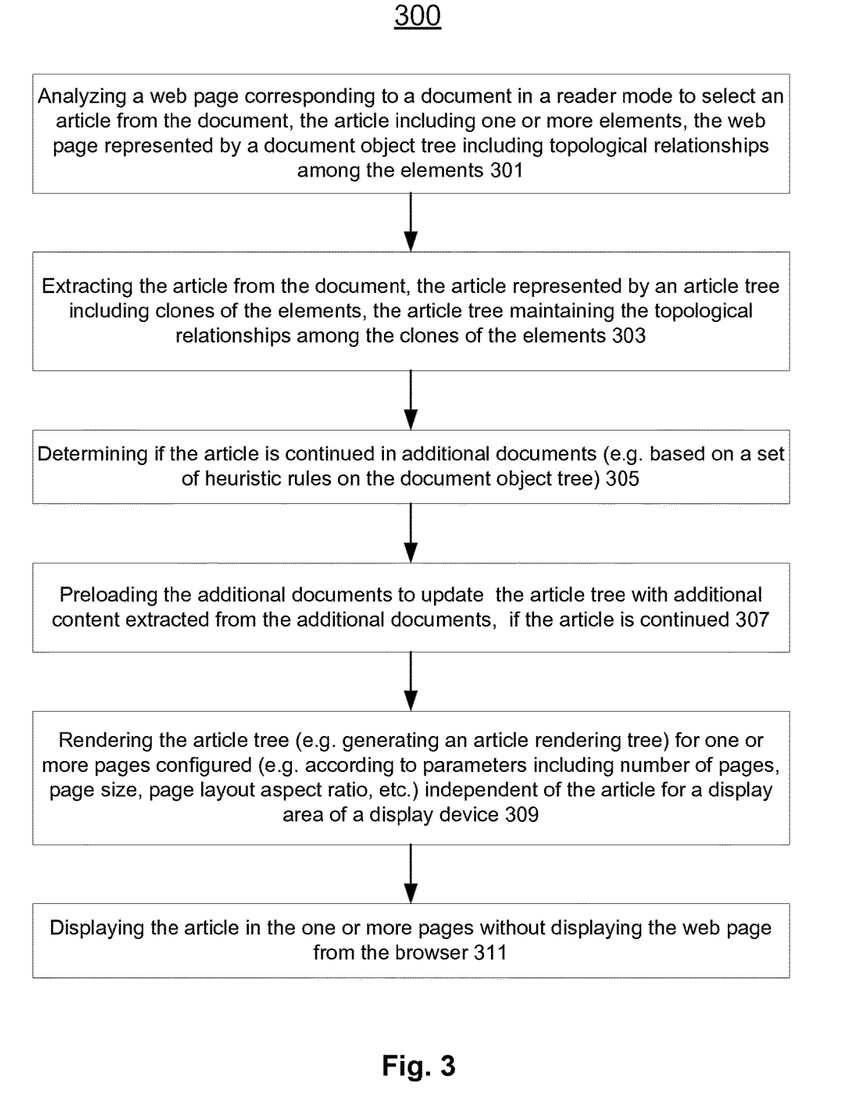
FIG. 3 is a flow diagram illustrating one embodiment of a process to present an article extracted from a web page in a reader mode.

FIG. 3 is a flow diagram illustrating one embodiment of a process to present an article extracted from a web page in a reader mode. Exemplary process 300 may be performed by a processing logic that may comprise hardware (circuitry, dedicated logic, etc.), software (such as is run on a dedicated machine), or a combination of both. For example, process 300 may be performed by some components of system 100 of FIG. 1. At block 301, the processing logic of process 300 may analyze a web page corresponding to a document in a reader mode to extract an article from the document. In one embodiment, the web page may be represented by a rendered DOM tree generated for the document in a browser. Each node in the rendered DOM tree may correspond to an element or a pair of elements (e.g. <P> and </P>) in the document. The processing logic of process 300 may select one or more sub-trees from the rendered DOM tree for extracting the article.

At block 303, in one embodiment, the processing logic of process 300 may extract an article selected from a document. The extracted article may include elements cloned (copied) from the document. An article tree may represent the extracted article including clones (or copies) of selected sub trees from a DOM tree representing the document. Topological relationships among cloned elements may be maintained between the DOM tree and the article tree. The processing logic of process 300 may combine and/or split the cloned sub trees for the article tree.

In one embodiment, at block 305, the processing logic of process 300 may apply a set of heuristic rules to determine if an article extracted from a document is continued in additional documents hyperlinked in the document. The processing logic of process 300 may recognize document signatures based on hypertext links embedded in the document to preload the additional documents to enable faster and easier navigation for connecting different pages within a single article in a seamless manner. Document signatures may include page numbers, next/previous page links and/or other page navigation indicators. For example, anchors to link among different parts of a text content or an article may be based on a set of common marks, such as "next", "previous", "<", ">", "+", "−" or sequence numbers. Potential anchors indicating additional documents for an article may belong to cloned document elements corresponding to an article tree. In some embodiments, the processing logic of process 300 may search the original DOM tree for a document to identify the potential anchors. The processing logic of process 300 may indicate a navigation position for a presented page within an article, e.g. by highlighting a portion of an array of dots as part of a user interface for the presented page.

If an article is continued via identified anchors at block 307, the processing logic of process 300 can follow hyperlinks associated with the identified anchors to preload additional documents for the article. In one embodiment, the processing logic of process 300 may recursively follow hyperlinks via a series of documents to collect multiple parts of a single article. The processing logic of process 300 may update an article tree to append different preloaded parts of the article. In one embodiment, the processing logic of process 300 may remove an element representing an anchor linking to a preloaded document for appending a part of the article extracted from the preloaded document to the article tree.

At block 309, the processing logic of process 300 can render an article tree (e.g. assigning layout parameters for each node) according user interface configurations for a reader mode on a display screen. In one embodiment, the user interface configurations for a reader mode may correspond to horizontally or vertically aligned windows allocated substantially covering the display screen, e.g. similar to two pages aligned side by side in an open book. Parameters to configure user interface for a reader mode may include page size, page layout aspect ratio, and/or number of pages etc. In some embodiment, the processing logic of process 300 can dynamically configure user interface for a reader mode based on screen sizes, user inputs, or other specifications independent of an article to be displayed. For example, sizing of a page may be changed, such as smaller, longer or wider to render a DOM element for an article into a view port as one single column, two columns plus a page margin (e.g. for linking to next page), or two full pages etc.

The processing logic of process 300 may render an article tree into a plurality of partitioned article trees, each for one screen display. For example, the processing logic of process 300 may determine more than one screen displays are required to present an article when generating rendering information for the article tree. In one embodiment, the processing logic of process 300 may partition a rendered article tree based on a printing algorithm (e.g. for generating multiple pages to print an article via a printer device). To support page browsing in a reader mode, additional anchor links, e.g. represented by a partial page on a display area, made be created in each partitioned article tree. At block 311, the processing logic of process 300 may display the article in one or more windows allocated as pages on a display screen according to a reader mode without displaying a web page corresponding to the original document. In one embodiment, the processing logic of process 300 may bring a browser back to a regular mode (e.g. to present documents received as in a regular mode) when identifying clicks on links of an article presented in a reader/viewer mode.

Figure 4:
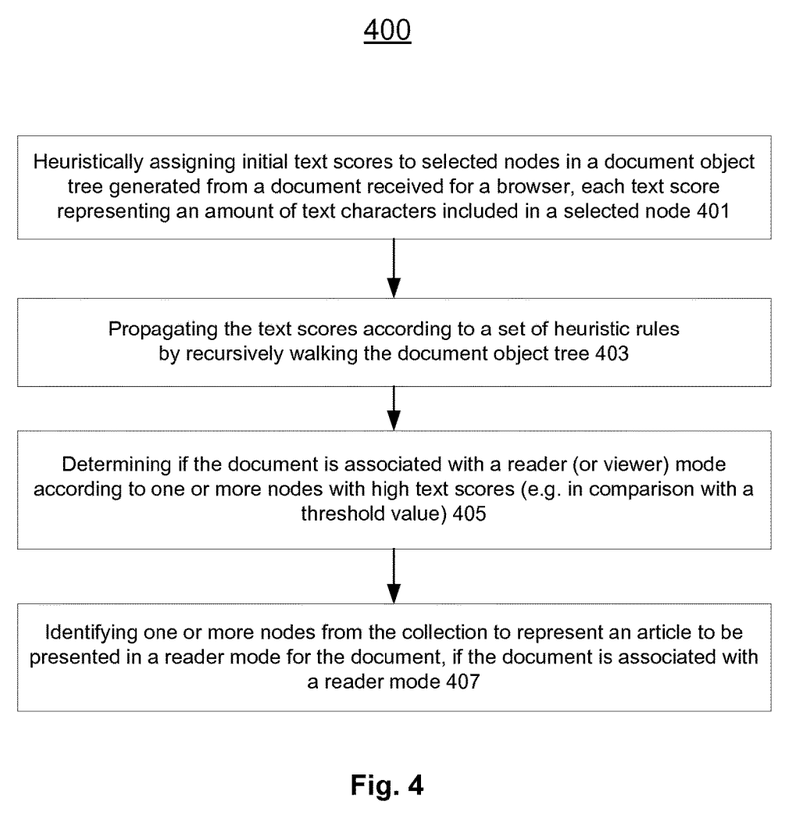
FIG. 4 is a flow diagram illustrating one embodiment of a process to identify a reader mode from a representation of a web page corresponding to a document.

FIG. 4 is a flow diagram illustrating one embodiment of a process to identify a reader mode from a representation of a web page corresponding to a document. Exemplary process 400 may be performed by a processing logic that may comprise hardware, software, or a combination of both. For example, process 400 may be performed by the processing logic of process 300 at block 301 of FIG. 3. In one embodiment, the processing logic of process 400 may analyze a document received at a browser to determine if a reader mode is associated with the document. Analysis of the document may be based on a representation of a corresponding web page as a rendered DOM tree in the browser.

At block 401, the processing logic of process 400 can heuristically select one or more nodes from a DOM tree to assign initial text scores, e.g. according to a set of heuristic rules. A text score associated with a node in a DOM tree may indicate a degree of possibility the node represents an article. A text score for a node corresponding to a document element may depend on one or more characteristics of the node including the number of text characters, the number of links to additional documents, the number of immediate child nodes, and/or other characteristics. In one embodiment, a DOM tree may include text nodes representing text data. A text node may be an edge node (e.g. without children nodes) in the DOM tree. The processing logic of process 400 can assign an initial text score to each text node as the number of text characters included. In some embodiments, selected nodes for assigning initial text scores may include paragraph nodes (e.g. corresponding to tag <P>) and/or division nodes (e.g. corresponding to tag <DIV>) with initial text scores assigned as the total number or an amount of text characters included in the offspring text nodes of the selected nodes.

At block 403, the processing logic of process 400 can heuristically (e.g. based on a set of heuristic rules) propagate initial text scores assigned by recursively walking the DOM tree. For example, the processing logic of process 400 can traverse the DOM tree in a depth first order from a root node of the DOM tree to propagate the text scores in a bottom up manner. A text score assigned to a child node may be propagated to a parent node if the child node has sibling nodes under the parent node. A parent node may be assigned a text score according to a sum of text scores of its children nodes. In some embodiments, a text score assigned (or propagated) to a child node may be prohibited from propagating to its grand parent node (e.g. with a text score of 0). When the DOM tree is completely traversed, the propagation of text scores may result in a portion of the DOM tree assigned with text scores (e.g. with a text score greater than 0).

Subsequently, at block 405, the processing logic of process 400 can determine if a document is associated with a reader mode (or a viewer mode) according to one or more nodes with high text scores. In one embodiment, a high text score can be a score higher than a threshold value, which may be preconfigured or set up dynamically based on rendering parameters such as font size, screen size, or other heuristic values. The document may not be associated with a reader mode if a corresponding DOM tree does not include a node with a high text score.

At block 407, if the document is determined as in a reader mode, at block 407, the processing logic of process 400 can identify or select one or more nodes with high text scores to represent an article. When a node is selected, a sub tree rooted by the node may also be selected. In one embodiment, the processing logic of process 400 can select a node having the highest text score. In some embodiments, a plurality of nodes having similar text scores (e.g. having differences less than a certain configured value) may be selected.

Figure 5A:
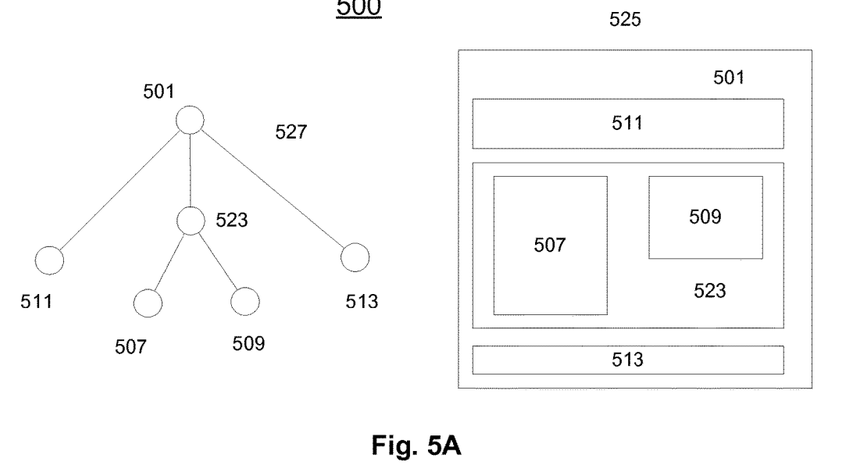
FIGS. 5A-5C are sample diagrams illustrating examples of user interface configurations for presenting an article from a document in a reader mode.
Figure 5B:
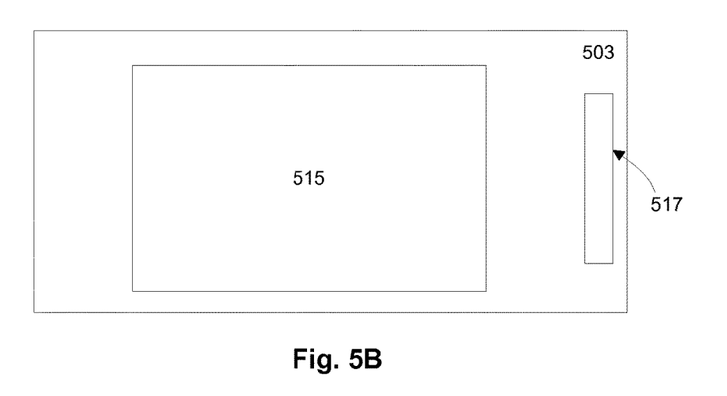
Figure 5C:
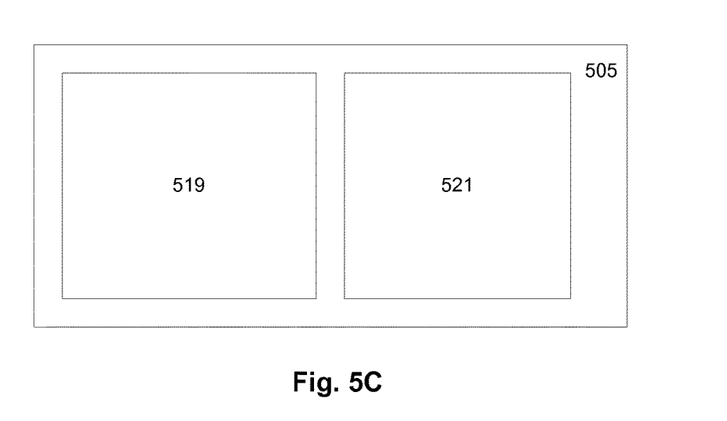

FIG. 5A-5C are sample diagrams illustrating examples of user interface configurations for presenting an article from a document in a reader mode. For example, diagram 500 may be presented according to the processing logic of process 400 of FIG. 4. In one embodiment, diagram 525 may illustrate rendering data associated with a portion of a rendered DOM tree 527 representing a web page inside a browser for a hypertext document. Each node in tree 525 may correspond to an area in diagram 525. A reader mode may be identified in the hypertext document with node 523 selected to identify an article. Nodes 507, 509 may include significant text content for the article. Node 509 may have an offspring node representing a hyperlink to access documents including other portions of the article.

Turning now to FIG. 5B, display 503 may be a display screen including a single page window 515 for presenting an article, e.g. corresponding to node 523 of FIG. 5A, extracted from a hypertext document to produce a reader mode of the hypertext document. Area 517 may include an indicator, e.g. showing a partial page or other marks, indicating additional portions of the article presented. In one embodiment, area 503 may include a darkened background for presenting the article in areas 515, 517 in a reader mode.

Turning now to FIG. 5C, display 505 may be a display screen including double page windows 519, 521 for presenting a full article, e.g. corresponding to node 523 of FIG. 5A, in a reader mode. Additional documents may be preloaded via hyperlinks associated with node 523 of FIG. 5A to extract a complete article for a presentation configured as book like pages in page windows 519, 521. Screen 505 and screen 503 of FIG. 5B may not show content, such as in nodes 511, 513 of FIG. 5A, other than the extracted article.

Figure 6A:
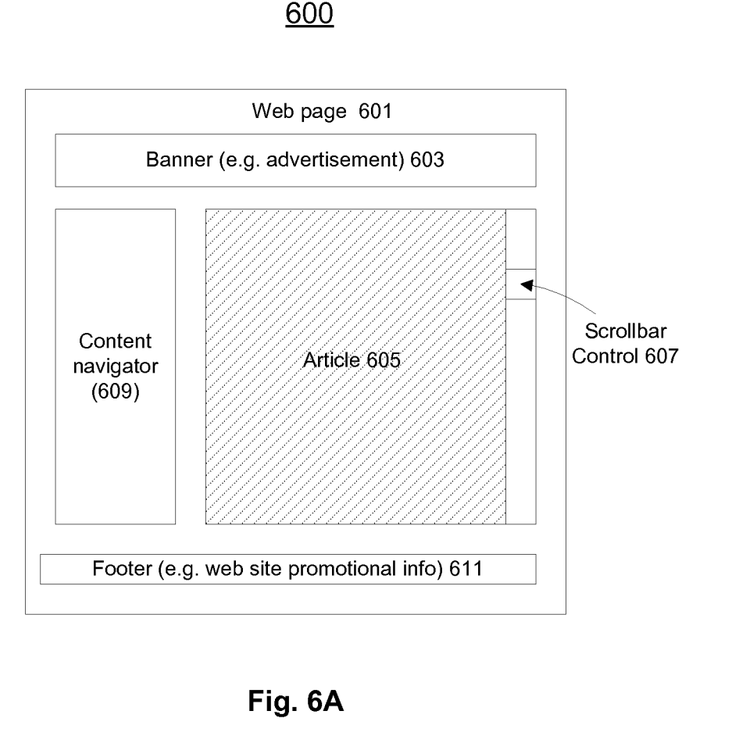
FIGS. 6A-6B are sample diagrams illustrating an example of presenting an article from a document in a reader mode.
Figure 6B:
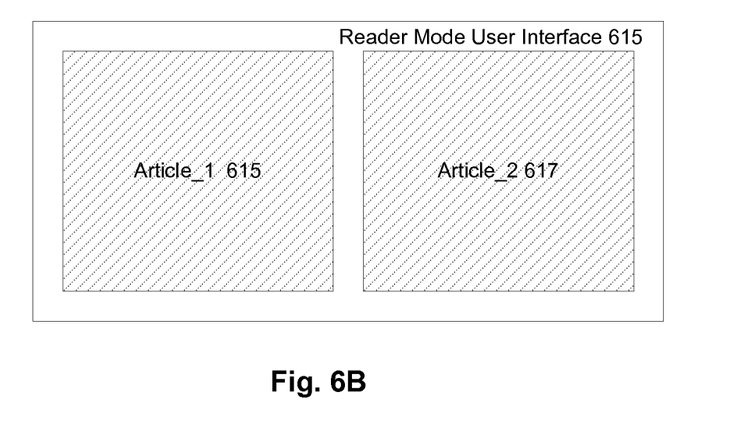

FIGS. 6A-6B are sample diagrams illustrating an example of presenting an article from a document in a reader mode. For example, diagram 600 may be presented according to the processing logic of process 400 of FIG. 4. In one embodiment, web page 601 may represent a hypertext document rendered by a browser. Web page 601 may include banner 603 displaying, for example, advertisement content. Content navigator 609 may be configured to navigate content hosted together with the hypertext document, e.g. in a web site from a remote web server. Web page 601 may include footer 611, for example, to promote a web site In one embodiment, a reader mode may be determined according to article 605 in web page 601. Article 605 may include a long text article which may cause a browser to present a scrollbar control 607 for a user to access the whole article included in web page 601. Turning now to FIG. 6B, a reader mode user interface 615 may be configured to present article 605 extracted from web page 601 in a reader mode without presenting content not extracted from web page 601, such as banner 603, navigator 609 and/or footer 611 etc. In one embodiment, reader mode user interface 615 may present article 605 in a manner similar to pages in an opened book, such as article_1 615 for a left page and article_2 617 for a right page without a need for a scroll bar control.

Figure 7:
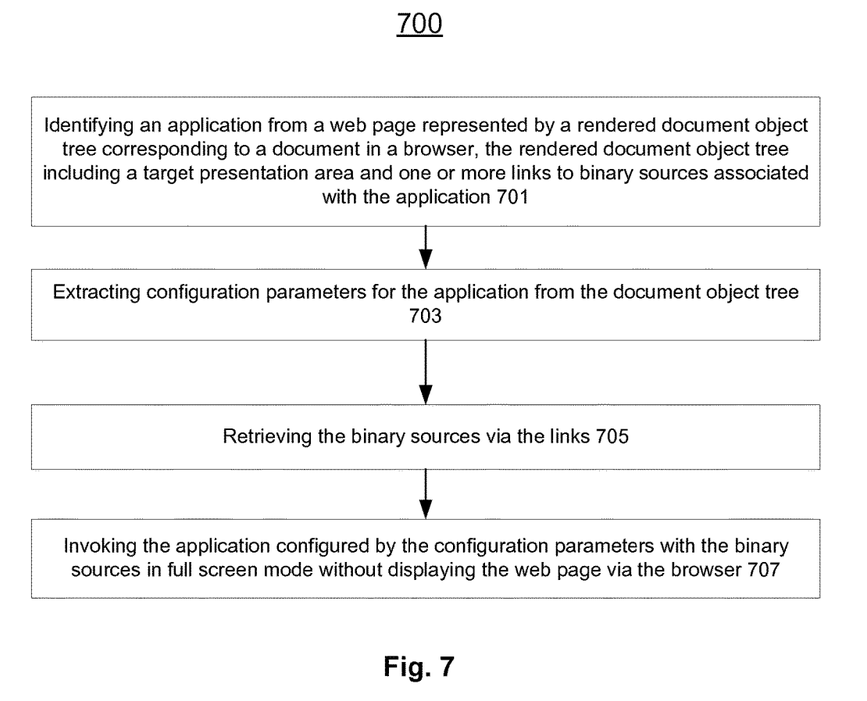
FIG. 7 is a flow diagram illustrating one embodiment of a process to invoke an application running in full screen mode based on parameters extracted from a web page corresponding to a document.

FIG. 7 is a flow diagram illustrating one embodiment of a process to invoke an application running in full screen mode based on parameters extracted from a web page corresponding to a document. Exemplary process 700 may be performed by a processing logic that may comprise hardware (circuitry, dedicated logic, etc.), software (such as is run on a dedicated machine), or a combination of both. For example, process 700 may be performed by some components of system 100 of FIG. 1. In one embodiment, at block 701, the processing logic of process 700 can identify an application for a document received at a browser in a special mode, such as a movie mode, a gallery mode, a game mode or other special modes.

The processing logic of process 700 may inspect a rendered document object tree or DOM tree for a document to determine if the document is associated with an application in a special mode. The DOM tree may represent a web page which corresponds to the document in a browser. In some embodiments, a document may include meta data indicating a mode of the document. For example, the document may include hypertext tags, such as XML based tag elements, having identifiable values associated with a specific mode. For example, the identifiable values may specify a source for a movie or other multimedia content feed or services for a movie mode. Typically, one or more known source of multimedia content or services, such as YOUTUBE®, FLICKER®, NETFLIX®, FACEBOOK®, HULU® or other content providers may be preconfigured as identifiable values.

In one embodiment, the processing logic of process 700 may extract meta data which indicates an application associated with the document from either directly from the DOM tree or indirectly via hyperlinked documents. For example, the processing logic of process 700 can follow a link included in the DOM tree to retrieve an XML document, an RSS (Really Simple Syndication) feed or other coded data describing an application for the document. The processing logic of process 700 may be preconfigured with a set of known applications to interpret meta data extract from a document.

In some embodiments, a user interface may be presented for a user to explicitly select one of a number of possible modes. For example, a document without a large enough number of text characters may be heuristically identified as in both movie and gallery modes but not in a reader/viewer mode. As a result, a user interface including two buttons, one to select the movie mode and another to select a gallery mode may be presented to solicit a user's selection. The processing logic of process 700 may include a learning mechanism to incorporate a user's selection to improve mode identification for a document, e.g. to enable automatically mode identification as the user's selection for a similar document.

In one embodiment, the processing logic of process 700 can employ heuristics to determine if a document or hypertext document is associated with an application for presentation. Heuristics for identifying a movie mode for a document may include aspects of the document, such as the number text characters included, the existence of plug-in applications, locations and sizes of the plug-in applications, and/or identifications of the plug-in applications, etc. Similarly, heuristics for identifying a gallery or slide mode for the document may include the number text characters included, the number of links to image (or image links), the sizes of linked images, the existence of plug-in slide show application, identifications of plug-in slide show applications, or other applicable heuristics, etc. Typically, a document associated with a movie mode or a gallery mode may include a small number of text characters (e.g. compared with a preset threshold value).

For example, a document may be associated with a special application (e.g. movie or galley applications) if a rendered DOM tree for the document includes a substantially large presentation area (e.g. more than one third of a display screen area) positioned front center for a browser window, and the rendered DOM tree includes one or more links to binary sources associated with the application targeting the presentation area. In one embodiment, a presentation area may be substantially large if the presentation area relative to the total area rendered for the DOM tree is greater than a threshold percentage value, which may be preset or dynamically determined. A link to a binary source, such as multimedia content for movie, sound, etc. or binary executables for games or other interactive player, may include configuration parameters indicating the target presentation area for content presentation or player invocation.

At block 703, if a document is determined to be in a special mode associated with an application, the processing logic of process 700 can extract configuration parameters for invoking or performing the application from a rendered DOM tree corresponding to the document. In one embodiment, the processing logic of process 700 may extract configuration parameters from sources of meta data dynamically loaded according to links included the DOM tree. At block 705, if the application is not yet loaded, the processing logic of process 700 may dynamically download binary sources (or executable sources) for the application according to meta data extracted directly or indirectly from the DOM tree. For example, a document can include a link via meta data or RSS feed for sources specifying the application as a plug-in application or a plug-in control.

In some embodiments, the processing logic of process 700 can heuristically identify content sources for an application from a document in a special mode associated with the application. For example, a document associated with a slide show application may include multiple thumbnails, each corresponding to a link to an image source for a slide, e.g. a high resolution counter part image for the thumbnail. The processing logic of process 700 can identify the thumbnails in the document to preload the images sources. In one embodiment, an image source for a slide presentation may be indirectly linked via the thumbnail identified.

The processing logic of process 700 may determine an image source (or picture) corresponding to a thumbnail from a document linked via the thumbnail. The linked document may include a plurality of images. The processing logic of process 700 may select an image corresponding to the thumbnail from the plurality of images depending on factors including the image size, a similarity measure between the image and the thumbnail, explicit meta data associated with the image, and/or other appropriate parameters. Explicit meta data may include RSS feed specifying a source, a title and/or other information associated with the corresponding image. Typically, the image corresponding to the thumbnail for a slide show application may be of a larger size (e.g. above a certain percentile threshold, such as 90%) among the images. In one embodiment, an image corresponding to a thumbnail for a slide show application may be based on a background image embedded in the linked document.

The processing logic of process 700 can perform an image similarity analysis (e.g. based on image similarity comparison algorithms) on the images against the thumbnail to obtain similarity measures. The processing logic of process 700 may select an image most similar to the thumbnail according to the image analysis for the slide application. In some embodiments, the processing logic of process 700 can enlarge a thumbnail to generate an image source for a slide application if a high resolution counter part image cannot be located (e.g. when a link is missing, broken, or no images analyzed is similar to the thumbnail according to a similarity threshold configured in the image analysis).

At block 707, in one embodiment, the processing logic of process 700 can invoke an application for a document identified in a special mode associated with the application without displaying a web page corresponding to the document by a browser. In one embodiment, an application may be based on script codes or a plug-in control embedded in a document. An evaluation engine may be invoked to execute script codes, e.g. JavaScript codes, included in a document to identify and present the document in a special mode, such as playing a movie. In one embodiment, the application can be configured according configuration parameters (e.g. specified as meta data), extracted from the document, such as a preferred screen size, and/or other style information. For example, the application may be a QUICKTIME® player for a movie with button control and a movie source (e.g. via a link) configured by the configuration parameters. The processing logic of process 700 may invoke the QUICKTIME® player in full screen mode including the configured button control. In one embodiment, the processing logic of process 700 can retrieve the movie source for the QUICKTIME® player in real time (e.g. streaming) without pre-loading the movie source.

In some embodiments, an application associated with a special mode for a document may be a browser itself. The processing logic of process 700 may present a separate DOM tree rendered by the browser without presenting a web page corresponding to the document. For example, the processing logic of process 700 may create a DOM tree representing a slide web page to perform a slide show by a browser for a gallery application. The slide web page may include hyperlinks associated with thumbnails representing slide images for a slide show. In one embodiment, the slide web page may be based on a template web page including a show area and a control area. The template web page may be preconfigured independent of documents received at a browser. The processing logic of process 700 may update the control area to include the thumbnails hyperlinked to the slide images.

Figure 8:
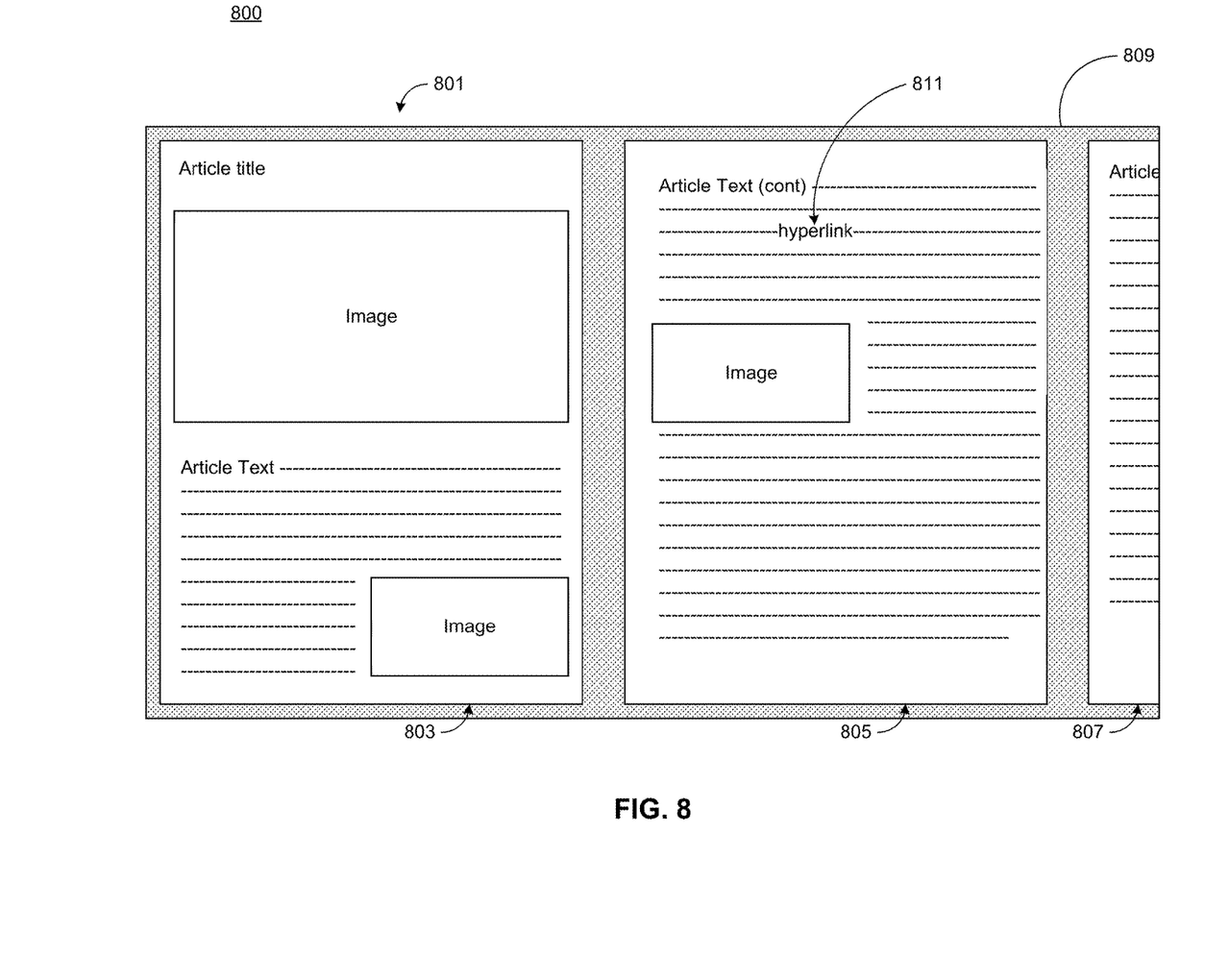
FIG. 8 is a sample screen shot illustrating one example of user interface configured for a reader mode to present an article extracted from a web document.

FIG. 8 is a sample screen shot illustrating one example of user interface configured for a reader mode to present an article extracted from a web document. Screen 801 may represent a full or substantially full screen shot for a display screen. In one embodiment, screen 801 may present an article extracted from a hypertext document received at a browser in a reader mode. Windows 803, 805 may be horizontally aligned as two columns simulating the look and feel of left and right pages of a book opened. Window 807 may include a page margin indicating additional pages are available for the article. When clicked, window 807 may cause windows 803, 805 to display subsequent content for the article. Background 809 may include a darkened browser window. When a link of the article, such as link 811, is clicked, in one embodiment, the darkened browser window in background 809 may light up to display a web page corresponding to the link while windows 803, 805, and 807 fade away from screen 801.

Figure 9:
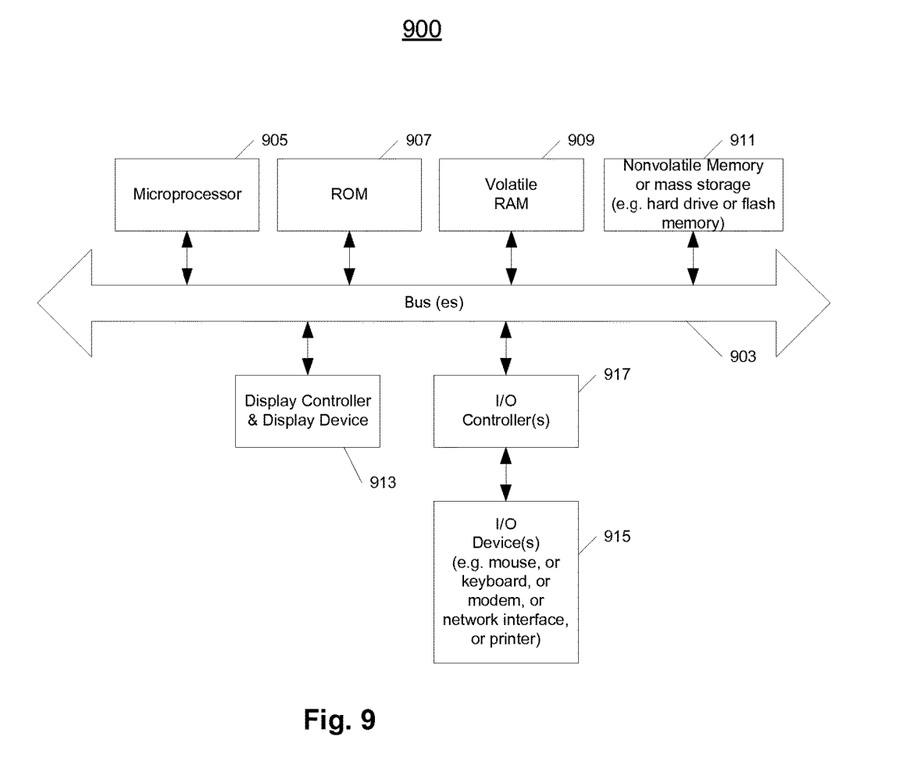
FIG. 9 illustrates one example of a data processing system such as a computer system, which may be used in conjunction with the embodiments described herein.

FIG. 9 shows one example of a data processing system such as a computer system, which may be used with one embodiment the present invention. For example, the system 900 may be implemented as a part of the system shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 913 and to peripheral devices such as input/output (I/O) devices which may be mice, keyboards, modems, network interfaces, printers and other devices which are well known in the art. Typically, the input/output devices 915 are coupled to the system through input/output controllers 917. The volatile RAM (Random Access Memory) 909 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or a flash memory or other types of memory systems which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions, which when executed by a machine, cause the machine to perform a method, the method comprising:
- receiving a request to display a web page that comprises a first part of a multi-part article;
- in response to receiving the request to display the web page, rendering the web page in a non-reader mode, wherein rendering the web page in the non-reader mode includes displaying the first part of the multi-part article, a hyperlink to a second part of the multi-part article, and other content that is not part of the multi-part article;
- generating a document object model (DOM) for the web page, and determining respective scores for one or more nodes of the DOM indicating a degree of possibility that the one or more nodes represent an article;
- determining whether or not to display the web page in a reader mode based on the one or more respective scores; and
- in response to determining to display the web page in the reader mode:
  - identifying the second part of the multi-part article that is not included in the web page based on information from the web page;
  - obtaining the second part of the multi-part article; and
  - re-rendering the web page in a reader mode, wherein re-rendering the web page in the reader mode includes:
    - displaying the first part of the multi-part article and the second part of the multi-part article;
    - removing the other content that is not part of the multi-part article from at least the first part of the multi-part article; and
    - removing the hyperlink to the second part of the multi-part article from at least the first part of the multi-part article.

2. The medium of claim 1, wherein the information from the web page includes the hyperlink to the second part of the multi-part article and wherein the second part of the multi-part article is obtained using the hyperlink.

3. The medium of claim 2, wherein different parts of the multi-part article are included in multiple web pages linked via different hyperlinks.

4. The medium of claim 3, wherein the obtaining the second part of the multi-part article comprises:
- preloading the multiple web pages via the different hyperlinks, wherein the multiple web pages include the second web page and wherein the different hyperlinks include the hyperlink to the second web page.

5. The method of claim 4, wherein each of the multiple web pages corresponds to one of a plurality of document object trees that are embedded with anchor elements representing the different hyperlinks and wherein the preloading comprises:
- recursively following the anchor elements to collect the multi-part article via the multiple web pages.

6. The medium of claim 5, wherein the different hyperlinks have document signatures indicating additional parts of the multi-part article,
- the method further comprising determining if the multi-part article is continued based on the document signatures of the hyperlinks.

7. The medium of claim 6, wherein the document signatures include one or more marks indicating page navigation, and wherein the determining if the multi-part article is continued comprises:
- searching the plurality of document object trees to identify the anchor elements based on the one or more marks.

8. The medium of claim 5, wherein the different parts of the multi-part article are collected into an article tree, and wherein displaying the content that corresponds to the web page in the reader mode is based on a user interface configuration independent of the web page.

9. The medium of claim 8, wherein the user interface configuration for the reader mode includes one or more pages laid out on a display screen with a visual effect simulating pages in a book.

10. The medium of claim 8, wherein the web page includes layout specifications, and wherein displaying the content that corresponds to the web page comprises:
- rendering the article tree according to the user interface configuration independent of the layout specification of the web page.

11. The medium of claim 8, wherein the preloading comprises:
- updating the article tree to append the different parts of the multi-part article from the preloaded web pages.

12. The medium of claim 11, wherein the article tree includes an element representing an anchor linking to one of the preloaded web pages and wherein the article tree is updated to remove the element.

13. The medium of claim 1, further comprising identifying the reader mode associated with the web page, wherein the identification is based on heuristic rules.

14. The medium of claim 1, wherein the first part of the multi-part article is associated with a first hyperlink, and the second part of the multi-part article is associated with a second hyperlink that is different from the first hyperlink.

15. A computer implemented method comprising:
- receiving a request to display a web page that comprises a first part of a multi-part article;
- in response to receiving the request to display the web page, rendering the web page in a non-reader mode, wherein rendering the web page in the non-reader mode includes displaying the first part of the multi-part article, a hyperlink to a second part of the multi-part article, and other content that is not part of the multi-part article;
- generating a document object model (DOM) for the web page, and determining respective scores for one or more nodes of the DOM indicating a degree of possibility that the one or more nodes represent an article;
- determining whether or not to display the web page in a reader mode based on the one or more respective scores; and
- in response to determining to display the web page in the reader mode:
  - identifying the second part of the multi-part article that is not included in the web page based on information from the web page;
  - obtaining the second part of the multi-part article; and
  - re-rendering the web page in a reader mode, wherein re-rendering the web page in the reader mode includes:
    - displaying the first part of the multi-part article and the second part of the multi-part article;

removing the other content that is not part of the multi-part article from at least the first part of the multi-part article; and removing the hyperlink to the second part of the multi-part article from at least the first part of the multi-part article.

16. An apparatus comprising:

a memory storing executable instructions;

a user interface device including a display screen; and a processing system coupled to the user interface device and the memory to execute the executable instructions from the memory, the processing system being configured to:

receive a request to display a web page that comprises a first part of a multi-part article;

in response to receiving the request to display the web page, render the web page in a non-reader mode, wherein rendering the web page in the non-reader mode includes displaying the first part of the multi-part article, a hyperlink to a second part of the multi-part article, and other content that is not part of the multi-part article;

generate a document object model (DOM) for the web page, and determine respective scores for one or more nodes of the DOM indicating a degree of possibility that the one or more nodes represent an article;

determine whether or not to display the web page in a reader mode based on the one or more respective scores; and in response to determining to display the web page in the reader mode:

identify the second part of the multi-part article that is not included in the web page based on information from the web page, obtain the second part of the multi-part article, and re-render the web page in a reader mode, wherein re-rendering the web page in the reader mode includes:

displaying the first part of the multi-part article and the second part of the multi-part article;

removing the other content that is not part of the multi-part article from at least the first part of the multi-part article; and removing the hyperlink to the second part of the multi-part article from at least the first part of the multi-part article.

* * * * *